United States Patent
Reynolds et al.

(10) Patent No.: US 11,303,366 B2
(45) Date of Patent: Apr. 12, 2022

(54) PASSIVE HARMONIC TEST SYSTEM AND METHOD

(71) Applicant: The Boeing Company, Chicago, IL (US)

(72) Inventors: Robert L. Reynolds, Thousand Oaks, CA (US); James T. Farrell, Hermosa Beach, CA (US); James D. Cooper, Torrence, CA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 16/109,660

(22) Filed: Aug. 22, 2018

(65) Prior Publication Data

US 2020/0067613 A1 Feb. 27, 2020

(51) Int. Cl.
*H04B 17/345* (2015.01)
*H04B 17/318* (2015.01)

(52) U.S. Cl.
CPC ......... *H04B 17/345* (2015.01); *H04B 17/318* (2015.01)

(58) Field of Classification Search
CPC ............................ H04B 17/345; H04B 17/318
See application file for complete search history.

(56) References Cited

U.S. PATENT DOCUMENTS

| | | | | | |
|---|---|---|---|---|---|
| 2,988,693 | A | * | 6/1961 | Billig | G01R 19/10 324/614 |
| 9,210,598 | B1 | * | 12/2015 | Bradley | H04W 24/04 |
| 9,768,812 | B1 | * | 9/2017 | Tsui | H04B 1/109 |
| 9,977,068 | B1 | * | 5/2018 | Bradley | H04B 17/14 |
| 10,038,522 | B1 | * | 7/2018 | Ju | H04L 1/243 |
| 10,637,567 | B1 | * | 4/2020 | Bradley | H04B 17/0085 |
| 2012/0119918 | A1 | * | 5/2012 | Williams | H02H 3/335 340/664 |
| 2014/0119197 | A1 | * | 5/2014 | Maca | H04B 17/0085 370/241 |
| 2015/0071097 | A1 | * | 3/2015 | Entsfellner | G01R 35/005 370/252 |
| 2016/0366605 | A1 | * | 12/2016 | Tsui | H04W 24/08 |
| 2017/0302390 | A1 | * | 10/2017 | Entsfellner | H04B 3/46 |
| 2018/0219636 | A1 | * | 8/2018 | Gale | H04B 17/26 |
| 2019/0273564 | A1 | * | 9/2019 | Vella-Coleiro | H04B 3/46 |

* cited by examiner

*Primary Examiner* — Jeffrey M Rutkowski
*Assistant Examiner* — Jasper Kwoh
(74) *Attorney, Agent, or Firm* — McDonnell Boehnen Hulbert & Berghoff LLP

(57) ABSTRACT

Methods and systems for harmonic intermodulation testing are presently disclosed. The test system includes a signal generator configured to generate a test signal having a first frequency. The test system also includes an antenna system configured to transmit a representation of the test signal and receive a harmonic intermodulation signal. The test system also includes a filter configured to remove signals, from a representation of the harmonic intermodulation signal, over a bandwidth that includes the first frequency. The test system also includes an analysis unit configured to measure a power level of a second frequency contained in the representation of the harmonic intermodulation signal. The analysis unit is also configured to determine a passive intermodulation magnitude at any order based on the power level of second frequency.

20 Claims, 7 Drawing Sheets

PASSIVE HARMONIC TEST SYSTEM AND METHOD

FIELD

The present disclosure relates generally to a test system for use in testing radio transmission systems. In further examples, the test system may be used for testing passive intermodulation.

BACKGROUND

During the testing and operation of radio systems, it is generally desirable to identify and reduce sources of interference in the radio system. Interference may reduce the quality of the radio link and/or performance of a radar or radio system. Interference may take many forms. External systems may produce electromagnetic signals that interfere with desired signals. External interference may be caused by both natural sources and unnatural sources. For example, solar flares and lightning are known sources of interference. Unnatural sources may include unintentional interference, such as other radio devices operating in proximity or intentional interference sources, such as radio jamming. Further, internal systems and components may also cause interference.

One specific form of interference is passive intermodulation (PIM). PIM is caused by nonlinearities in passive components of a system at manifest as intermodulation of a signal. For example, metal-to-metal contacts in connectors, cables, antennas, and reflecting surfaces may cause PIM. Additionally, surface materials and corrosion of the materials may cause PIM as well. PIM may result in radio signals at different frequencies as the intended signal that land in the intended receiving band and prevent successful operation.

SUMMARY

The present disclosure is designed to address at least one of the aforementioned problems and/or meet at least one of the aforementioned needs. By designing a harmonic test system that includes a single frequency test channel, a simpler harmonic test system may be created that reduces electronic complexity compared to existing multicarrier NM testing equipment. By reducing electronic complexity the harmonic test system may be built as a handheld portable unit for in-field harmonic testing of components and structures. For example, a handheld test unit may be used in the field to test surfaces, components, and materials for use in aircraft without having to subject the full aircraft to a fixed-location anechoic chamber or other radio testing facility. Additionally, this method allows for a higher dynamic range than existing systems as the magnitude of the resulting intermodulation signal is higher. This allows the system to be more sensitive to finding harmonic sources in test.

In one example, a test system is described. The test system includes a signal generator configured to generate a test signal having a first frequency. The test system also includes an antenna system configured to transmit a representation of the test signal and receive a signal from the harmonic source. The test system also includes a filter configured to remove signals, from a representation of the harmonic signal, over a bandwidth that includes the first frequency. The test system also includes an analysis unit configured to measure a power level of a second frequency contained in the representation of the signal from the harmonic source. The analysis unit is also configured to determine a passive intermodulation magnitude based on the power level of second frequency.

In still another example, a test method is described. The method may include generating a test signal having a first frequency by a signal generator. The method may also include transmitting a representation of the test signal by an antenna system. The method may further include receiving a signal from the harmonic source by the antenna system. Additionally, the method may include removing signals, from a representation of the harmonic source signal, over a bandwidth by a filter, wherein the bandwidth includes the first frequency. The method may yet further include measuring a power level of a second frequency contained in the representation of the harmonic source signal by an analysis unit. Moreover, the method may include determining a passive intermodulation magnitude based on the power level of second frequency.

In another example, a non-transitory computer readable medium having stored thereon instructions that, upon executed by a computing device, cause the computing device to perform functions is described. The functions include causing the generation of a test signal having a first frequency by a signal generator. The functions further include causing the transmission a representation of the test signal by an antenna system. Additionally, the functions include removing signals, from a representation of a combined harmonic signal and the harmonic of the transmitted signal received by the antenna system, over a bandwidth by a filter, wherein the bandwidth includes the first frequency. Yet further, the functions include measuring a power level of a second frequency contained in the representation of the received signal by an analysis unit. The functions also include determining a passive intermodulation magnitude based on the power level of second frequency.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Examples, systems and methods for a harmonic test system are described. The present harmonic test system uses a single channel on the transmission front end. The present disclosure enables the creation of a harmonic test system that is smaller and more efficient than conventional PIM test systems. Because of the smaller and more efficient system, a harmonic test unit may be created that is both handheld and battery powered. As previously discussed, for example, a handheld test unit may be used in the field to test surfaces, components, and materials for use in aircraft without having to subject the full aircraft to an anechoic chamber or other radio testing facility.

For example, many different structures and apparatuses may undergo conventional PIM testing. For example, aircraft, spacecraft, building structures, radio towers, and many other may be tested to determine if each causes PIM. Conventionally, PIM testing involves a significant amount of test equipment and possibly an anechoic chamber and powered test article radiating with its own antennas. By using the techniques, methods, and devices of the present disclosure, a device may be manufactured that has desirable harmonic testing properties. Through the use of any type of the disclosed harmonic test system and method, a handheld test device may be created that would allow in-the-field testing of harmonic for various structures.

Figure 1:
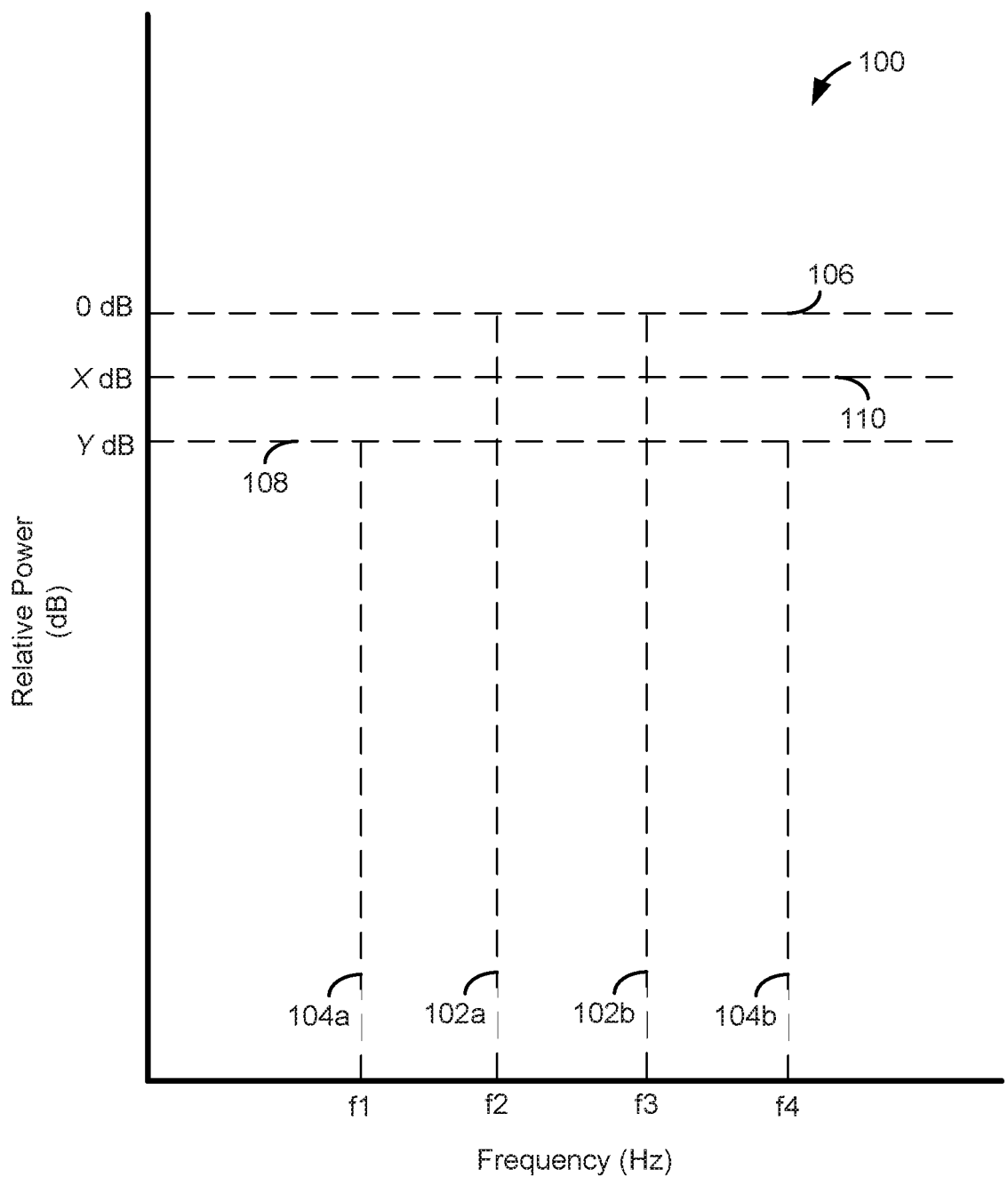
FIG. 1 is a diagrammatic representation of an example PIM measurement.

Referring now to the figures, FIG. 1 is a diagrammatic representation 100 of an example PIM measurement. FIG. 1 shows the frequency and relative power level of two transmitted signals, the first transmission signal 102a transmitted with a frequency f2 and the second transmission signal 102b transmitted with a frequency f3. FIG. 1 also shows frequency and relative power level of two received PIM signals, the first PIM signal 104a is received with a frequency f1 and the second. PIM signal 104b is received with a frequency f4. FIG. 1 shows two different PIM signals as the first PIM signal 104a and the second PIM signal 104b, however, there may be more PIM at different frequencies during the operation of a system. Those additional PIM signals may be treated in the same manner as the first PIM signal 104a and the second PIM signal 104b.

The first transmission signal 102a and the second transmission signal 102b may be transmitted with a relative power level shown as power level 106. As shown in FIG. 1, the first transmission signal 102a and the second transmission signal 102b are transmitted with the same power level. However, in other examples, the first transmission signal 102a and the second transmission signal 102b may be transmitted with different power levels from each other. Additionally, the diagrammatic representation 100 indexes power based on a relative power measure. A relative power measure shows the difference in decibels between two different power levels. For example, if a first example signal is transmitted with a 10 dBm (decibels relative to 1 milliwatt) and a second example signal is received with a −10 dBm power level, on diagrammatic representation 100 the first example signal would have an index of 0 decibels (dB, as it is has a power level that is 0 dB different from the maximum power level) and the second example signal would have an index of −20 dB (as it is has a power level that is 20 dB less than the maximum power level from which the index is measured).

In some examples, it may be possible to calculate the frequency of the first PIM signal 104a and the second. PIM signal 104b before the measurement is even made. When PIM is being measured with a conventional test system that transmits two transmission signals, the two frequencies of the PIM signals may be specified by formula 1 and formula 2, below:

$$f1 = 2*f2 - f3 \qquad \text{Formula 1}$$

$$f4 = 2*f3 - f2 \qquad \text{Formula 2}$$

Formula 1 and formula 2 specify the third-order PIM signals. There may be other signals as well, such as fifth-order, etc. But the description of those are not included for clarity.

When the first PIM signal 104a and the second PIM signal 104b are received each may have a respective power level. As shown in FIG. 1, the first PIM signal 104a and the second. PIM signal 104b are received with the same power level. However, in other examples, the first PIM signal 104a and the second PIM signal 104b may be transmitted with or received with power levels different from each other. As previously discussed, the diagrammatic representation 100 indexes power based on a relative power measure, and the first PIM signal 104a and the second signal 104b may be received with a power level 108 that is Y dB less than the transmission power level 106 of the first transmission signal 102a and the second transmission signal 102b.

In some instance of PIM testing, the first PIM signal 104a and the second PIM signal 104b may be compared to a predetermined PIM threshold 110 having a power level that is X dB. If the power level of either the first PIM signal 104a or the second PIM signal 104b exceed the PIM threshold 110, then the device under test may be deemed to have excessive PIM. The PIM threshold 110 may be chosen based on many different criteria. In some examples, a PIM threshold 110 may be chosen based on legal requirements, such as FCC guidelines. In other examples, the PIM threshold 110 may be chosen by a designer based on other design requirements.

Figure 2:
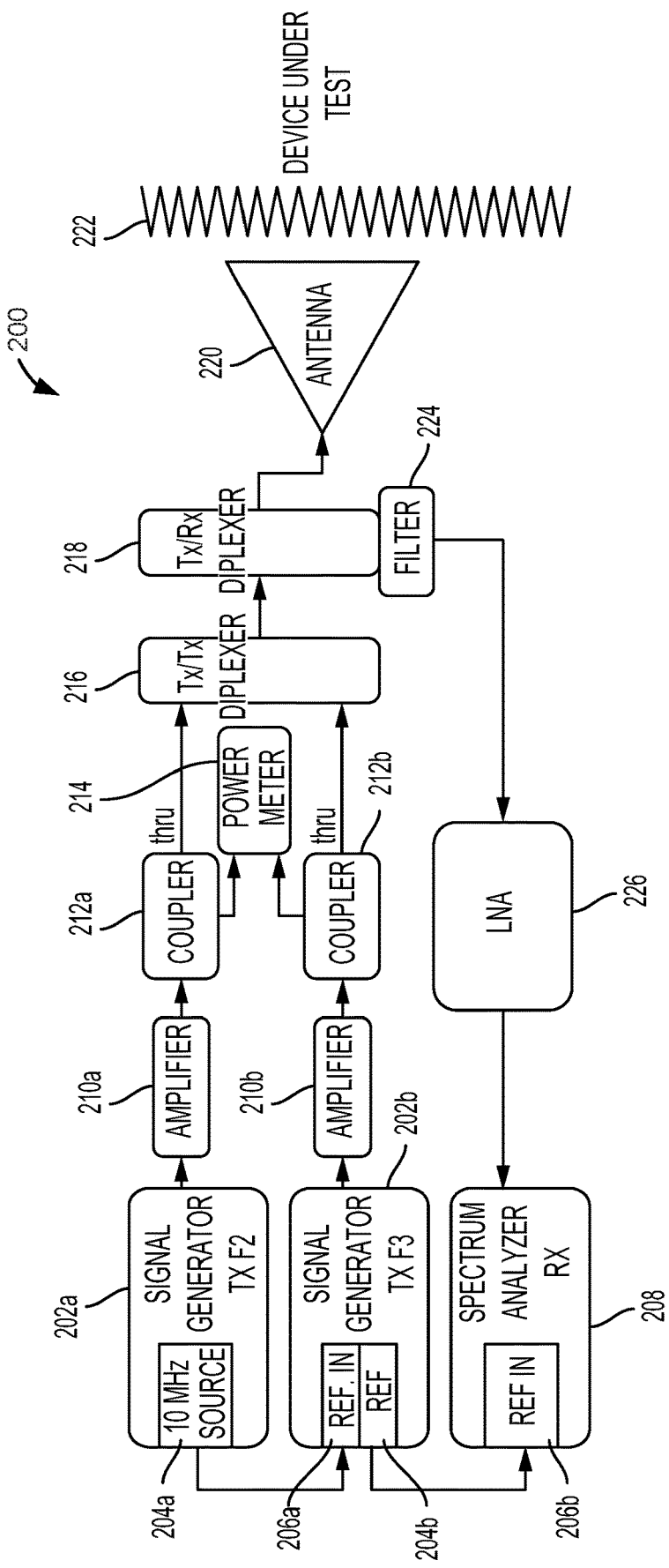
FIG. 2 is a diagrammatic representation of a conventional PIM test system.

FIG. 2 is a diagrammatic representation of a conventional PIM test system 200. The PIM test system 200 of FIG. 2 is one example of conventional test system. The arrangement of devices may be done in a different manner without departing from the main scope of conventional PIM test systems. The PIM test system 200 includes two signal generators, a first signal generator 202a and a second signal generator 202b. The first signal generator 202a may be configured to generate a first transmission signal having a frequency F2 and the second signal generator 202b may be configured to generate a second transmission signal having a frequency F3.

The first signal generator 202a may also be configured to generate a 10 megahertz (MHz) reference signal with reference signal generator 204a. The 10 MHz reference signal may be coupled from the reference signal generator 204a of first signal generator 202a to the second signal generator 202b by way of a reference signal input 206a of the second signal generator 202b. The 10 MHz reference signal may also be coupled from the reference signal output 204b of second signal generator 202b to a reference signal input 206b of a spectrum analyzer 208. The 10 MHz reference signal may be a clock signal to provide similar signal timing to the signal generators 202a and 202b and spectrum analyzer 208.

In some other examples, the reference signal may be a frequency other than 10 MHz. Additionally, the reference signal may be created and supplied in a different manner than shown in FIG. 2. For example, an external clock signal may be supplied to the first signal generator 202a, the second signal generator 202b, and spectrum analyzer 208. Yet further, the 10 MHz reference signal may be coupled from the reference signal generator 204a of first signal generator 202a to both the second signal generator 202b and the spectrum analyzer 208.

The signals generated by the first signal generator 202a and the second signal generator 202b may be amplified by a first amplifier 210a and a second amplifier 210b, respectively. Each amplifier may be configured to provide an amplification of signals having frequencies in a bandwidth that includes the frequency of the signals generated by the signal generators.

The amplified signals output by the first amplifier 210a and the second amplifier 210b may be coupled to respective couplers, first coupler 212a and second coupler 212b. Each coupler may be configured to split the respective received amplified signal based on a coupling ratio. For example, the coupling ratio may be 40 dB. When the coupling ratio is 40 dB, a majority of the amplified signal will pass through the coupler, while a signal that has a power level that is 40 dB less than the amplified signal will be split off by the coupler. In various other examples, a coupling ratio other than 40 dB may be used as well.

The split output of couplers 212a and 212b may be fed to a power meter 214. The power meter 214 may display the power level of the signal that was split from each respective amplified signal. In some examples, the power meter 214 may be used to determine if the generated signals have had a correct amplification provided. Additionally, the power meter may be used to establish a reference power level for the respective transmitted signals. The reference power levels may be used to determine the baseline relative power level (shown as power level 106 of FIG. 1).

The other output of couplers 212a and 212b may be fed to a transmission diplexer 216. The diplexer 216 is configured to receive two signals (one from each coupler) and generate a single output signal. The single output signal from diplexer 216 may be a signal that the two input signals added together. Diplexer 216 is labeled as TX/TX diplexer in FIG. 2 because the two signals it is receiving are both transmission (TX) signals. The combined signal from the diplexer 216 may be fed to diplexer 218.

Diplexer 218 is labeled as TX/RX diplexer in FIG. 2 because of the two signals it is receiving is a transmission (TX) signal and the other is a reception (RX) signal. The diplexer 218 may have three ports. The first port functions as an input for receiving the transmission signal. The second port functions as a two-way port, where it outputs the transmission signal and also receive the reception signal. The third port functions to output the reception signal.

The output of the diplexer 218 may be coupled to the antenna 220. The antenna 220 is configured to transmit the transmission signal and receive the reception signal. The reception signal may be reflections (and PIM) from the environment of the transmission. In some examples, the antenna 220 may be a horn antenna configured to transmit signals and receive signals over a bandwidth that includes the frequencies of the transmission signals and the frequencies of the PIM signal that are to be measured. During operation of the antenna 220, the antenna transmits the transmission signal by radiating the transmission signal into free space as a radiated signal. In some examples, the Tx/Tx diplexer 216 and Tx/Rx diplexer 218 may be omitted and instead replaced by additional antennas 220 at their respective frequencies.

The radiated signal may interface with the device under test 222. In some examples the device under test 222 may be an object for which PIM is to be measured. In other examples, the device under test 222 may be a radio absorber configured to not reflect any radio signals. When the device under test 222 is a radio absorber figured to not reflect any radio signals, the PIM signals measured by the system may be PIM generated by components of the system itself. Additionally, having the device under test 222 be a radio absorber configured to not reflect any radio signals may be useful for performing a system calibration.

When the radiated signal interfaces with the device under test 222, a received signal may be generated. The received signal generated may include both transmission frequencies reflected from a surface, as well as PIM signals created by the device under test 222, when the radiated signals strike the surface. A portion of the reflected signals and PIM may be received by the antenna 220 and converted into received signals. The received signals from the antenna 220 may be fed to the diplexer 218. The diplexer 218, in turn, may output the received signals to the filter 224.

The filter 224 may be configured as a narrowband filter that removes signals that correspond to the frequencies of the two transmitted signals. By removing frequencies of the two transmitted signals, the output of the filter 224 may include PIM signals and not the signals that were originally transmitted. In some examples, the filter may be a single filter or multiple filters, depending on the embodiment.

The output of the filter 224 may be fed to a low noise amplifier 226. The low noise amplifier 226 provides a predetermined level of amplification to the received signals. The amplifier may be used to provide a more accurate measurement of the signal levels of the PIM signals.

The output of the low noise amplifier 226 may be fed to the spectrum analyzer 208. The spectrum analyzer may measure the power level of the PIM signals and provide an output indicating the PIM signal levels. The measured power levels may be used to determine the PIM power levels (shown in FIG. 1).

Figure 3:
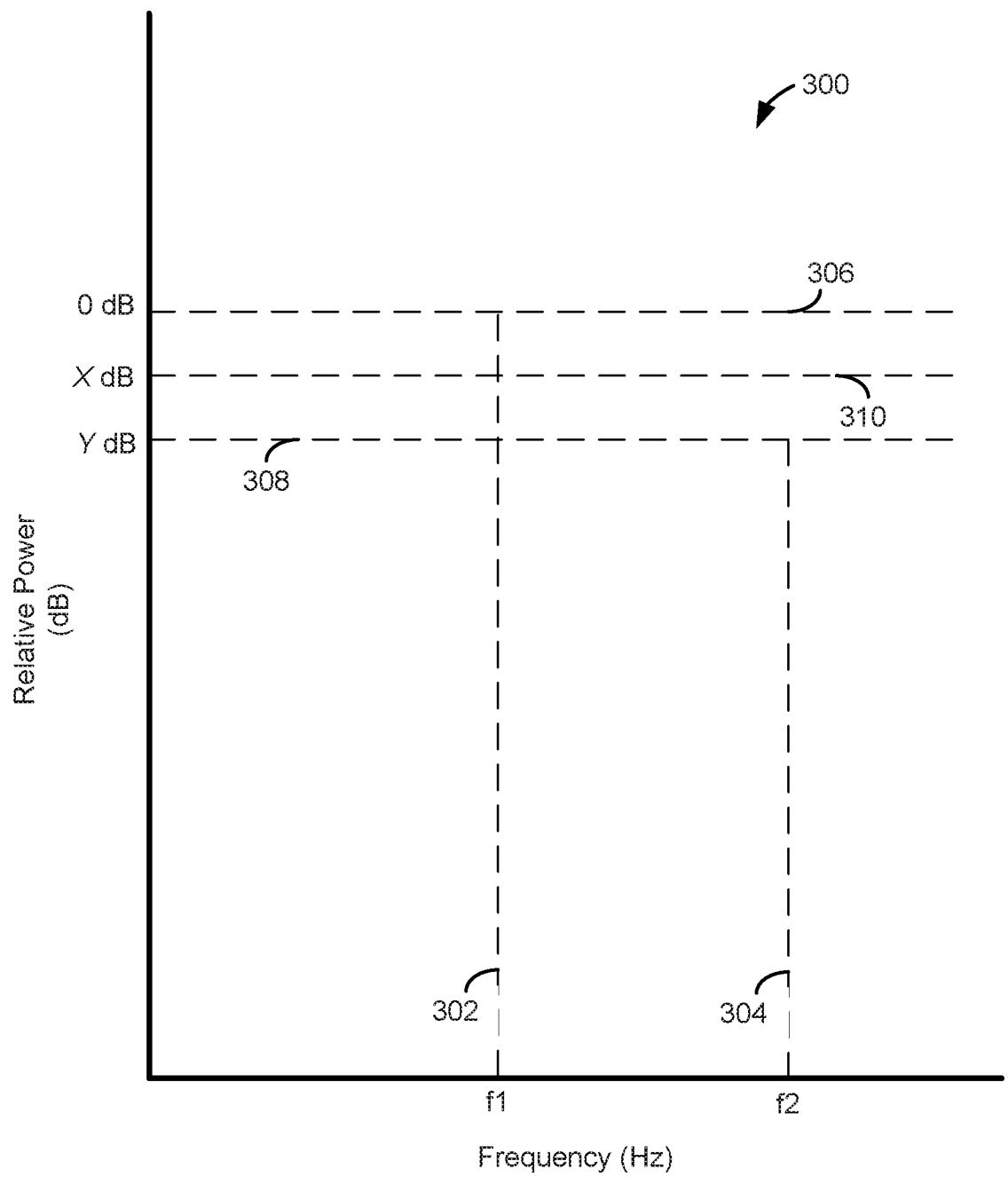
FIG. 3 is a diagrammatic representation of an example harmonic measurement.

FIG. 3 is a diagrammatic representation of an example harmonic measurement 300 of the presently disclosed system. FIG. 3 shows the frequency and relative power level of a transmitted signal 302 that has a frequency f1 and a relative power level 306, FIG. 3 also shows the frequency and relative power level of a received harmonic signal 304. The harmonic signal 304 is received with a frequency f2 and a power level 308. Similar to FIG. 1, FIG. 3 shows a harmonic signal, however, there may be more harmonic signals at different frequencies during the operation of a system. Those additional PIM signals may be treated in the same manner as the PIM signal 304. For example, harmonic signals may be at any integer multiple of the transmitted frequency.

Similar to as previously discussed with respect to FIG. 1, the transmission signal 302 may be transmitted with a relative power level shown as power level 306. The harmonic measurement 300 indexes power based on a relative power measure. For the present system, it may be possible to calculate the frequency of the harmonic signal 304 before the measurement is even made. When harmonics are being measured the disclosed harmonic test system that transmits a single transmission signal, the frequency of the harmonic signal may be specified by formula 3, below:

$$f2=3*f1 \qquad \text{Formula 3}$$

Formula 3 specifies the third-order harmonic intermodulation signal for a single frequency transmission. There may be other harmonic signals as well, such as fifth-order, etc. But the description of those are not included for clarity.

When the harmonic signal 304 is received it may have a respective power level. As previously discussed, the harmonic measurement 300 indexes power based on a relative power measure, and the harmonic signal 304 may be received with a power level 308 that is Y dB less than the transmission power level 306 of the transmission signal 302.

In some instance of harmonic testing, the harmonic signal 304 may be compared to a predetermined harmonic threshold 310 having a power level that is X dB. If the power level of the harmonic signal 304 exceeds the harmonic threshold 310, then the device under test may be deemed to have excessive harmonic signal power. The harmonic threshold 310 may be chosen based on many different criteria. In some examples, a harmonic threshold 310 may be chosen based on legal requirements, such as FCC guidelines. In other examples, the harmonic threshold 310 may be chosen by a designer based on other design requirements.

Figure 4:
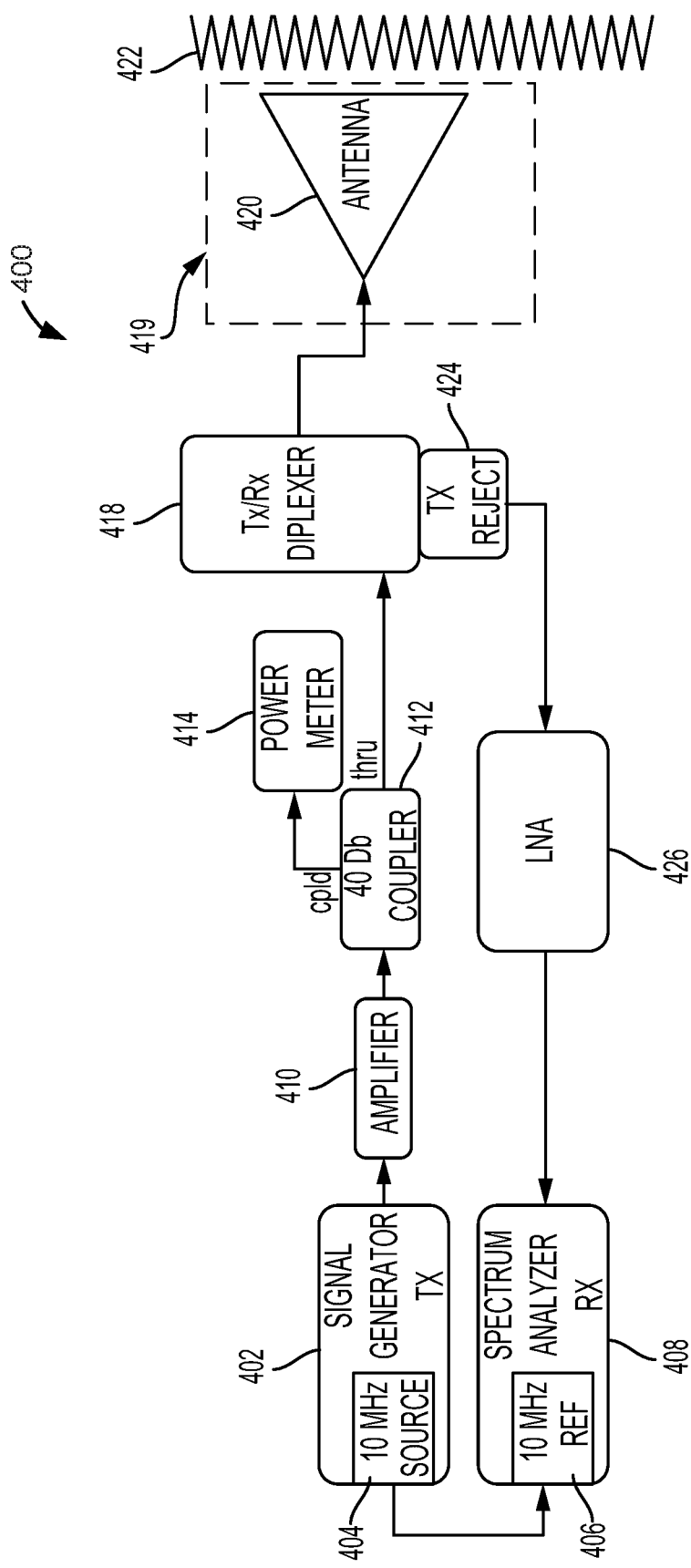
FIG. 4 is a diagrammatic representation of the disclosed harmonic test system.

FIG. 4 is a diagrammatic representation of the disclosed harmonic test system 400. The harmonic test system 400 of FIG. 4 is one example of the presently-disclosed harmonic test system. The arrangement of devices may be in a different manner without departing from the main scope of the disclosed harmonic test systems. The harmonic test system 400 includes a signal generator 402. The signal generator 402 may be configured to generate a transmission signal having a frequency F1.

The signal generator 402 may also be configured to generate a 10 MHz reference signal with local oscillator 404. The local oscillator 404 may be a reference signal generator. The 10 MHz reference signal may be coupled from the local oscillator 404 of signal generator 402 to a reference signal input 406 of an analysis unit 408. The analysis unit 408 may take the form of a spectrum analyzer. The 10 MHz reference signal may be a clock signal to provide similar signal timing to the signal generator 402 and analysis unit 408.

In some other examples, the reference signal may be a frequency other than 10 MHz. Additionally, the reference signal may be created and supplied in a different manner than shown in FIG. 4. For example, an external clock signal may be supplied to the signal generator 402 and analysis unit 408.

The signals generated by the signal generator 402 may be amplified by an amplifier 410. The amplifier may be configured to provide an amplification of signals having frequencies in a bandwidth that includes the frequency of the signals generated by the signal generator. The amplified signals output by the amplifier 410 may be coupled to a coupler 412. The coupler 412 may be configured to split the respective received amplified signal based on a coupling ratio. For example, the coupling ratio may be 40 dB. When the coupling ratio is 40 dB, a majority of the amplified signal will pass through the coupler, while a signal that has a power level that is 40 dB less than the amplified signal will be split off by the coupler. In various other examples, a coupling ratio other than 40 dB may be used as well.

The split output of the couplers 412 may be fed to a power meter 414. The power meter 414 may display the power level of the signal that was split from the amplified signal. In some examples, the power meter 414 may be used to determine if the generated signal has had a correct amplification provided. Additionally, the power meter may be used to establish a reference power level for the transmitted signal. The reference power level may be used to determine the baseline relative power level (shown as power level 306 of FIG. 3).

The other output of the coupler 412 may be fed to a diplexer 418. The diplexer 418 may have three ports. The first port functions as an input for receiving the transmission signal. The second port functions as a two-way port, where it outputs the transmission signal and also receive the reception signal. The third port functions to output the reception signal.

In some examples a filter (not shown) may be used to mitigate the transmission of any harmonic frequencies. The filter may be a discrete filtering component, or the filter may be built into the diplexer 418. The filter may remove harmonic frequency that were created by the amplifier (or other components).

The output of the diplexer 418 may be coupled to an antenna system 419. In some examples, the antenna system 419 may have one antenna, antenna 420. The antenna 420 is configured to transmit the transmission signal and receive the reception signal. In some examples the transmission signal may be a representation of the signal generated by the signal generator. The reception signal may be reflections and harmonics from the environment of the transmission. In some examples, the antenna 420 may be a horn antenna configured to transmit signals and receive signals over a bandwidth that includes the frequencies of the transmission signals and the frequencies of the harmonic signal that are to be measured. During operation of the antenna 420, the antenna transmits the transmission signal by radiates the transmission signal into free space as a radiated signal. In other examples, the Tx/Rx diplexer may be omitted and instead each path may use its own antenna 420 designed for its respective frequency. Additionally, the diplexer 418 along with other shielding components (not pictured) may function to prevent the leakage of harmonic signals created by the amplifier from coupling into the received signal pathway. Leakage is the signal coupling to the received signal pathway without having been transmitted by the antenna. Generally, leakage would occur within the device itself and shielding would mitigate the leakage.

The radiated signal may interface with the device under test 422. In some examples the device under test 422 may be an object for which harmonic signals are to be measured. In other examples, the device under test 422 may be a radio absorber configured to not reflect any radio signals. When the device under test 422 is a radio absorber configured to not reflect any radio signals, the harmonic signals measured by the system may be harmonic signals generated by components of the system itself. Additionally, having the device under test 422 be a radio absorber configured to not reflect any radio signals may be useful for performing a system calibration.

When the radiated signal interfaces with the device under test 422, a received signal may be generated. The received signal generated may include the transmission frequency, as well as harmonic intermodulation signals created by the device under test 422 when the radiated signals strike the surface. A portion of the reflected signals and harmonic signals may be received by the antenna 420 and converted into received signals. The received signals from the antenna 420 may be fed to the diplexer 418. The diplexer 418, in turn, may output the received signals to the filter 424.

The filter 424 may be configured as a narrowband filter that removes signals that correspond to the frequencies of the transmitted signal. By removing the frequency of the transmitted signal, the output of the filter 424 may include harmonic intermodulation signals and not the signal that was originally transmitted. In some examples, the filter may be a single filter or multiple filters, depending on the embodiment. Additionally, the filter may be configured to provide isolation of the transmission signals from the received signal pathway. Because a power level of received signals is significantly lower than the power level of transmitted signals, isolation of the transmitted signals from the receiver pathway may help the receiver from becoming saturated by the power level of the transmitted signals.

The output of the filter 424 may be fed to a low noise amplifier 426. The low noise amplifier 426 provides a predetermined level of amplification to the received signals. The amplifier may be used to provide a more accurate measurement of the signal levels of the harmonic signals. The output of the low noise amplifier 426 may be fed to the analysis unit 408. The spectrum analyzer may measure the power level of the harmonic signal and provide an output indicating the harmonic signal level. The measured power levels may be used to determine the harmonic power levels (shown in FIG. 3).

Figure 5:
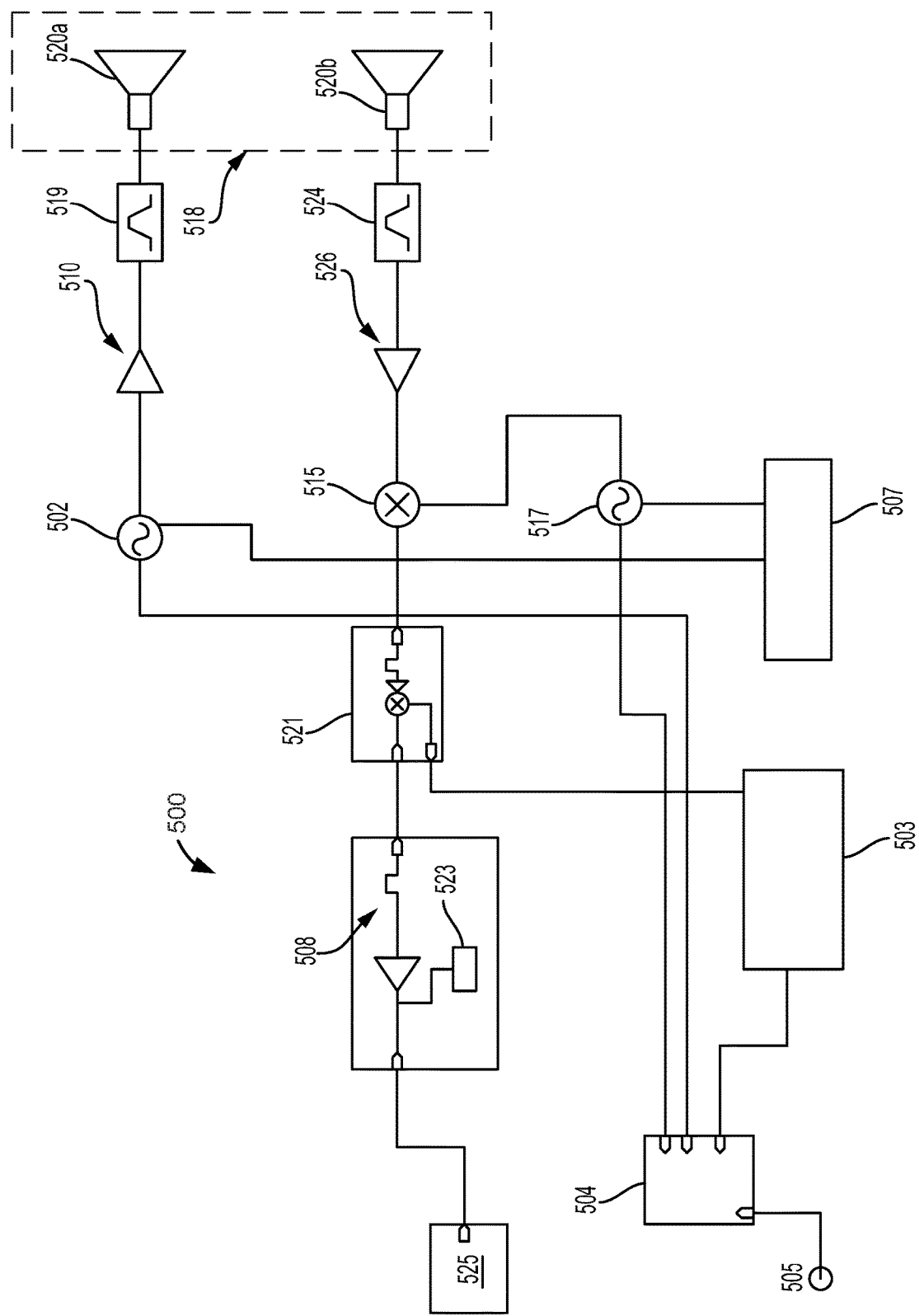
FIG. 5 is another diagrammatic representation of the disclosed harmonic test system.

FIG. 5 is another diagrammatic representation of the disclosed harmonic test system 500. The harmonic test system 500 of FIG. 5 is another example of the presently-disclosed harmonic test system. The arrangement of devices may be in a different manner without departing from the main scope of the disclosed harmonic test systems. The harmonic test system 500 includes a signal generator 502. The signal generator 502 may be configured to generate a transmission signal having a frequency F1. To generate the transmission signal, the signal generator 502 may be configured to receive a reference signal created by reference signal generator 504. The reference signal generator 504 may be configured to provide a 10 MHz reference signal. The reference signal generator 504 may generate the reference signal based on a clock signal provided by a local oscillator 505. The 10 MHz reference signal may be a clock signal to provide similar signal timing to the signal generator 402, second signal generator 517, and down conversion signal generator 503. In some other examples, the reference signal may be a frequency other than 10 MHz.

Additionally, the signal generator 502 may be coupled to a microcontroller 507. The microcontroller may be able to adjust the frequency of the signals generated by the signal generator 502. In some examples, the present system may be configured to provide a transmission signal that has a controllable frequency. In some examples, the transmission signal may be a cellular band signal, a Ku band signal, or a Ka band signal. Other signal frequencies are possible as well. The microcontroller 507 may be able to control the frequency of the transmission signal.

The signals generated by the signal generator 502 may be amplified by a first amplifier 510. The amplifier may be configured to provide an amplification of signals having frequencies in a bandwidth that includes the frequency of the signals generated by the signal generator. In one example, the generated signal may be a 10 GHz signal and the amplifier may be configured to provide 33 dB of amplification to the generated signal. In some examples, the signal output by the filter may have a power level of approximately +33 dBm.

The amplified signals output by the first amplifier 510 may be filtered by filter 519 to create a transmission signal. The filter 519 may be configured with a passband that is 200 MHz wide, centered at 10 GHz. The filter 519 functions to remove components of the generated signal that are outside the desired bandwidth. By removing signals outside the desired bandwidth, some distortions that are caused by either the signal generator 502 or the first amplifier 510 may be removed. If there are distortions from either the signal generator 502 or the first amplifier 510, these distortions may cause errors in the harmonic measurement as the distortions were not caused by the device under test. For example, a signal generator and/or amplifier may create harmonic signals itself. The filter 519 may function to remove these harmonics before the signal is transmitted by the antenna system 518.

The output of the filter 519 may be fed to an antenna system 518. In some examples, the antenna system 518 may include two antennas, antenna 520a and antenna 520b, The antenna 520a is configured to transmit the transmission signal. In some examples the transmission signal may be a representation of the signal generated by the signal generator. In some examples, the antenna 520a may be a horn antenna configured to transmit signals over a bandwidth that includes the frequencies of the transmission signals. During operation of the antenna 520a, the antenna transmits the transmission signal by radiating the transmission signal into free space as a radiated signal. Additionally, as previously discussed with respect to FIG. 4, the harmonic test system 500 may include other shielding components (not pictured) may function to prevent the leakage of harmonic signals created by the amplifier from coupling into the received signal pathway. Leakage is the signal coupling to the received signal pathway without having been transmitted by the antenna. Generally, leakage would occur within the device itself and shielding would mitigate the leakage.

The radiated signal may interface with the device under test (not shown). In some examples the device under test may be an object for which harmonic is to be measured. In other examples, the device under test may be a radio absorber configured to not reflect any radio signals. When the device under test is a radio absorber configured to not reflect any radio signals, the harmonic signals measured by the system may be harmonic generated by components of the system itself. Additionally, having the device under test be a radio absorber configured to not reflect any radio signals may be useful for performing a system calibration.

When the radiated signal interfaces with the device under test, a received signal may be generated. The received signal generated may include the transmission frequency, as well as harmonic intermodulation signals created by the device under test when the radiated signals strike the surface.

A portion of the reflected signals and harmonic signals may be received by the antenna 520b and converted into representations received signals. The representations received signals may be reflections and harmonics from the environment of the transmission, including reflections and harmonics from the device under test. In some examples, the antenna 520b may be a horn antenna configured to receive signals over a bandwidth that includes the frequencies of the transmission signals and the frequencies of the harmonic signal that are to be measured. However, in some other examples, the antenna 520b may be a horn antenna configured to receive signals over a bandwidth that includes the frequencies of the harmonic signal that are to be measured. In one example, the harmonic frequency to be measured is three times the transmission frequency, therefore the antenna 520b may be configured to receive 30 GHz signals. In other examples, the received signal may include harmonic signals that are other integer number times the transmission frequency. By choosing an antenna 520b that is not designed to receive signals that have the frequencies of the transmission signals, the overall signal received by the antenna 520b may be primarily those frequencies that may indicate harmonic caused by the device under test.

The representations received signals output by the antenna 520b may be coupled to a filter 524. The filter 524 may be configured as a narrowband filter that removes signals that correspond to the frequencies of the transmitted signal. By removing frequencies of the transmitted signal, the output of the filter 524 may include harmonic signals and not the signal that was originally transmitted. In some examples, the filter may be a single filter or multiple filters, depending on the embodiment. In one example, the filter may have a 3200 MHz bandwidth and be centered at approximately 30 GHz. This filter would allow a 30 GHz (three times the example transmission frequency) harmonic signal to pass.

Additionally, as shown in FIG. 5, the transmission pathway and the reception pathway may be isolated from each other. By isolating the two pathways, the likelihood of signal leakage between the two pathways may be reduced.

The output of the filter 524 may be fed to a second amplifier 526. The second amplifier 526 may be a low noise amplifier. The second amplifier 526 provides a predetermined. level of amplification to the received signals. The amplifier may be used to provide a more accurate measurement of the signal levels of the harmonic intermodulation signals. In some examples, the amplifier may be configured to provide 43 dB of amplification to the received signal.

The output of the second amplifier 526 may be fed to a mixer 515. The mixer 515 may receive an input signal provided by the second signal generator 517. The mixer 515 may be configured to down-convert the received signals. In one example, the down-conversion may down-convert the harmonic intermodulation signal to 11 MHz. The down-converted may be further amplified, filtered, and downconverted again by mixing unit 521. The mixing unit 521 may provide a more narrow banded filtering based on the down converted signal. Additionally, the additional amplification provided by the mixing unit may allow a more accurate measurement of the harmonic intermodulation signal. The mixing unit 521 may output a further downconverted received signal that has a frequency of 100 Hz.

The further downconverted received signal may be fed to an analysis unit 508. The analysis unit 508 may be configured to determine the power level of the harmonic intermodulation signal. The analysis unit 508 may measure the power level of the harmonic intermodulation signal and provide an output indicating the harmonic signal level. The measured power levels may be used to determine the harmonic power levels (shown in FIG. 3). Additionally, the analysis unit 508 may include an alert unit 523. The alert unit 523 may be configured to provide an alert if the measured harmonic exceeds a harmonic threshold. Further, the analysis unit 508 may be coupled to a data logging unit 525. The data logging unit 525 may be configured to store data related to harmonic measurements made with the harmonic test system 500. The data logging unit 525 may include a memory and/or may be coupled to a computing system.

Figure 6:
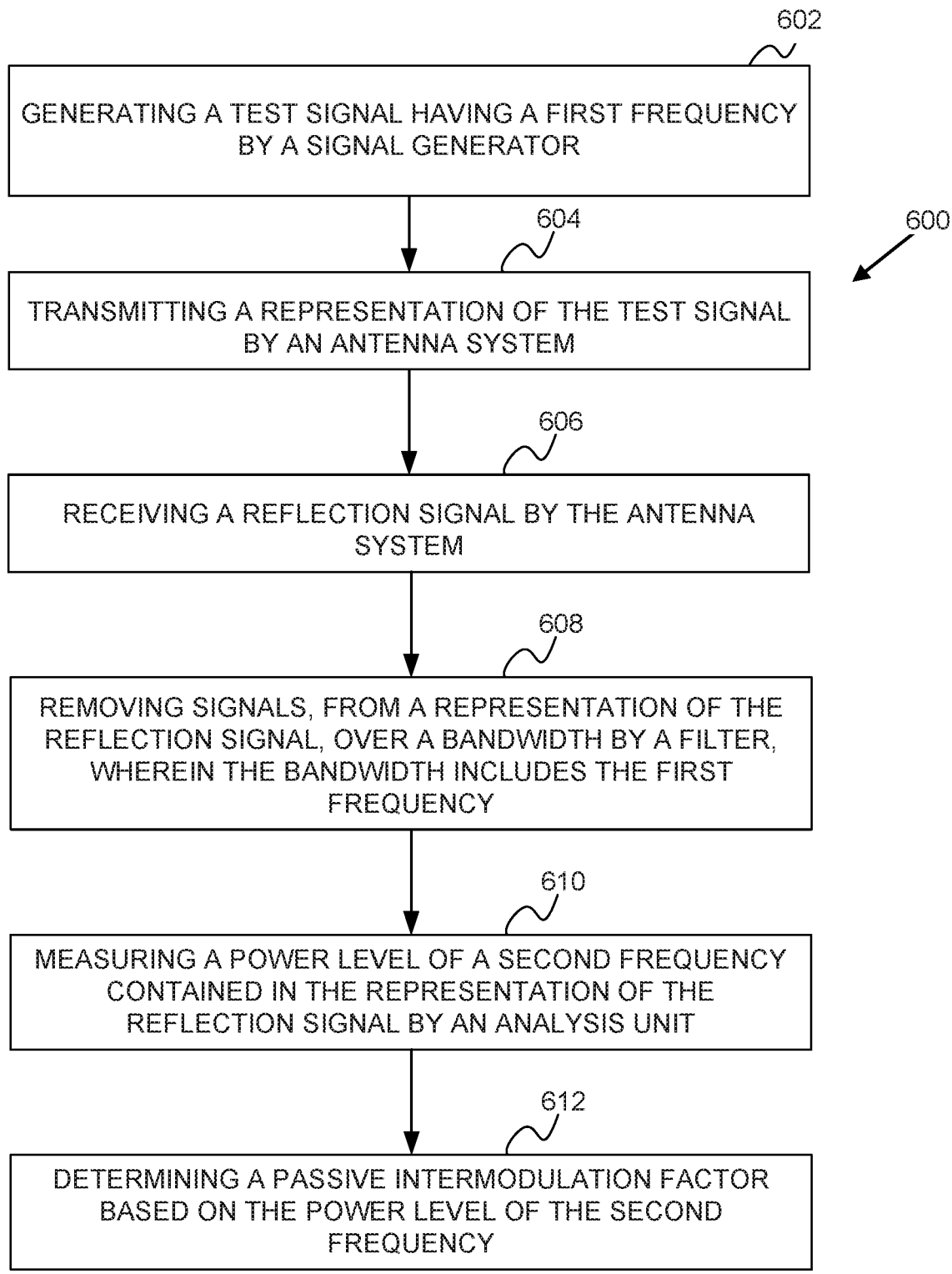
FIG. 6 is a diagrammatic representation of an example method for use with the harmonic test system disclosed herein.

FIG. 6 is a diagrammatic representation of an example method 600 for use with the harmonic test system disclosed herein. At block 602, method 600 includes generating a test signal having a first frequency by a signal generator. The test signal may be generated by the signal generator based on a clock signal. In some examples, block 602 may include generating a local oscillator signal and coupling the local oscillator signal to the signal generator. The local oscillator may provide the clock signal and the clock signal may function as a reference signal to the signal generator.

Additionally, in some examples, block 602 may include amplifying an output of the signal generator by a first amplifier. The output of the first amplifier may be a representation of the test signal. Yet further, block 602 may also include receiving the test signal and outputting the representation of the test signal to the antenna by a diplexer.

At block 604, the method includes transmitting a representation of the test signal by an antenna system. When the representation of the test signal is transmitted, it may be launched into free space toward a device under test. The device under test may reflect a portion of the transmitted signal and also introduce PIM and/or harmonic intermodulation in the received signals.

At block 606, the method includes receiving a harmonic signal by the antenna system. The harmonic signal contains the intermodulation signal. In some examples, the transmitting the representation of the test signal by the antenna system at block 604 and the receiving the signal by the antenna system at block 606 are performed by a single antenna of the antenna system. In other examples, the transmitting the representation of the test signal by the antenna system at block 604 is performed by a first antenna and the receiving the harmonic intermodulation signal by the antenna system at block 606 is performed by a second antenna.

Additionally, block 606 may include receiving the harmonic intermodulation signal from the antenna and outputting the representation of the harmonic intermodulation signal to the filter by the diplexer. The diplexer may be configured to prevent a leakage of the test signal into the representation of the harmonic intermodulation signal.

At block 608, the method includes removing signals, from a representation of the harmonic intermodulation signal, over a bandwidth by a filter, where the bandwidth includes the first frequency. The filter may be configured to remove the transmission frequencies from the representation of the harmonic intermodulation signal. In some examples, the second frequency (i.e., the harmonic intermodulation frequency) is three times the first frequency. Additionally, block 608 may include amplifying an output of the filter by a second amplifier, where an output of the second amplifier is coupled to the input of the analysis unit.

At block 610, the method includes measuring a power level of a second frequency contained in the representation of the harmonic intermodulation signal by an analysis unit. The analysis unit may be coupled the local oscillator signal. The local oscillator signal may function as a clock signal for a reference signal to the analysis unit. In some other example, block 610 may include performing at least one down conversion on the representation of the harmonic intermodulation signal. The local oscillator signal may be coupled to one or more down conversion units.

At block 612, the method includes determining a passive intermodulation magnitude based on the power level of the second frequency. The passive intermodulation magnitude may be determined based on the power level of the second frequency contained in the representation of the harmonic intermodulation signal. In some examples, the passive intermodulation magnitude may be determined by comparing a power level of a transmitted signal with the power level of the second frequency contained in the representation of the harmonic intermodulation signal. Additionally, block 612 may include providing an indication of a power level exceeding a threshold power level by the analysis unit.

Figure 7:
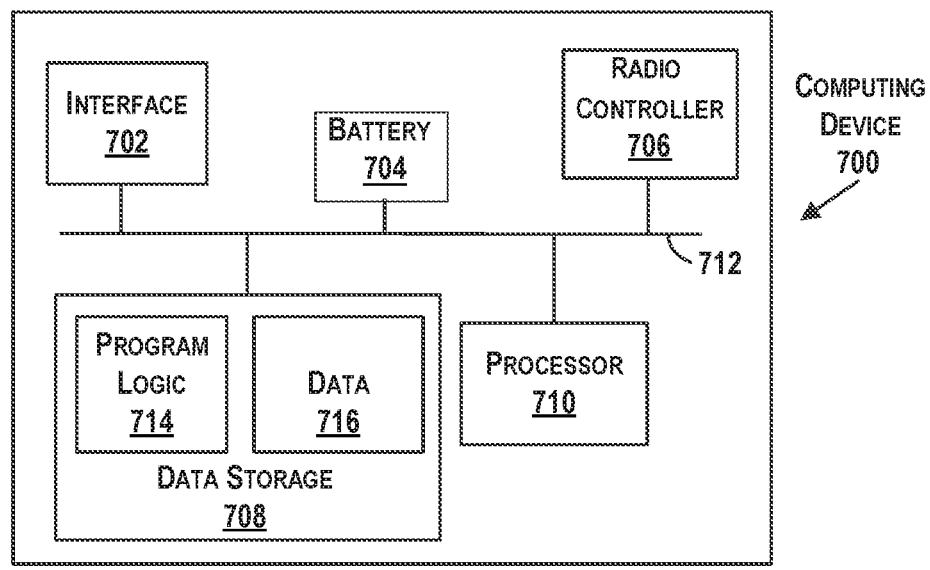
FIG. 7 is a diagrammatic representation of an example computing device that may be configured to control some of the operation of the harmonic test system.

A computing device 700 may be configured to control some of the operation of harmonic test systems disclosed herein. The computing device 700 may include an interface 702, a battery 704, radio controller 706, data storage 708, and a processor 710. Components illustrated in FIG. 7 may be linked together by a communication link 712. The computing device 700 may also include hardware to enable communication within the computing device 700 and between the computing device 700 and another computing device (not shown), such as a server entity. The hardware may include the radio system, such as transmitters, receivers, and antennas, for example. The communication link 712 may be coupled to the various components of FIGS. 4 and 5 to provide control signals to control the components operation based on instructions from computing device 700.

The data storage 708 may store program logic 714 that can be accessed and executed by the processor 710. The data storage 708 may also store collected measurement data as the data 716. For example, the processor 710 may use the data 716 to alert an operator when a harmonic threshold is met. The program logic 714 and or radio controller 706 may be configured to control the frequency of operation of the harmonic test device. Additionally, the battery 704 may enable the device to operate as a portable handheld harmonic test system.

By the term "substantially", "about", and "approximately" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A test system comprising:
a signal generator consisting of a single frequency source and configured to generate a test signal having a first frequency;
an antenna system comprising a single antenna that is coupled to a diplexer, wherein the single antenna is configured to:
transmit a representation of the test signal;
receive a harmonic signal;
wherein the diplexer is configured to:
receive the test signal and output the representation of the test signal to the single antenna for transmission by the single antenna;
receive the harmonic signal from the single antenna and output a representation of the harmonic signal; and
prevent a leakage of the test signal into the representation of the harmonic signal;
a filter configured to receive the representation of the harmonic signal from the diplexer and to remove signals, from the representation of the received harmonic signal, of the first frequency of the test signal that is transmitted; and
an analysis unit configured to receive an output from the filter and to:
measure a power level of a second frequency remaining in the representation of the harmonic signal, and
determine a passive harmonic based on the power level of the second frequency.

2. The system of claim 1, further comprising a local oscillator coupled to the signal generator and the analysis unit, wherein the local oscillator provides a reference signal to both the signal generator and the analysis unit.

3. The system of claim 1, further comprising a first amplifier coupled to an output of the signal generator, wherein an output of the first amplifier is the representation of the test signal.

4. The system of claim 1, further comprising a second amplifier coupled to an output of the filter, wherein an output of the second amplifier is coupled to an input of the analysis unit.

5. The system of claim 1, wherein the analysis unit is further configured to provide an indication of a power level exceeding a threshold power level.

6. The system of claim 1, wherein the second frequency is three times the first frequency.

7. The system of claim 1, wherein the analysis unit determines the passive intermodulation based on the power level of second frequency by:
comparing the power level of the second frequency to a threshold; and
based on the power level of the second frequency exceeding the threshold, determining the passive intermodulation exists.

8. The system of claim 1, wherein the second frequency is representative of a third-order harmonic intermodulation signal.

9. The system of claim 1, wherein the analysis unit measures provides an indexing of the power level of the second frequency remaining in the representation of the harmonic signal based on a relative power measure as compared to a transmission power level of transmission of the representation of the test signal.

10. A test method comprising:
generating a test signal having a first frequency by a signal generator consisting of a single frequency source;
receiving the test signal and outputting a representation of the test signal to an antenna system by a diplexer;
transmitting the representation of the test signal by the antenna system comprising a single antenna;
receiving a harmonic signal by the single antenna of the antenna system;
receiving the harmonic signal from the single antenna and outputting a representation of the harmonic signal to a filter by the diplexer;

preventing a leakage of the test signal into the representation of the harmonic signal by the diplexer;
removing signals, from the representation of the harmonic signal, of the first frequency of the test signal that is transmitted by the filter;
measuring a power level of a second frequency remaining in the representation of the harmonic signal by an analysis unit; and
determining a passive harmonic based on the power level of the second frequency.

11. The method of claim 10, further comprising:
generating a local oscillator signal;
coupling the local oscillator signal to the signal generator and the analysis unit; and
providing a reference signal to both the signal generator and the analysis unit.

12. The method of claim 10, further comprising amplifying an output of the signal generator by a first amplifier, wherein an output of the first amplifier is a representation of the test signal.

13. The method of claim 10, further comprising amplifying an output of the filter by a second amplifier, wherein an output of the second amplifier is coupled to the input of the analysis unit.

14. The method of claim 10, further comprising providing an indication of a power level exceeding a threshold power level by the analysis unit.

15. The method of claim 10, wherein the second frequency is an integer factor times the first frequency.

16. The method of claim 10, wherein determining the passive intermodulation based on the power level of the second frequency comprises:
comparing the power level of the second frequency to a threshold; and
based on the power level of the second frequency exceeding the threshold, determining the passive intermodulation exists.

17. The method of claim 10, further comprising:
indexing the power level of the second frequency remaining in the representation of the harmonic signal based on a relative power measure as compared to a transmission power level of transmission of the representation of the test signal.

18. A non-transitory computer readable medium having stored thereon instructions that, upon executed by a computing device, cause the computing device to perform functions, the functions comprising:
causing the generation of a test signal having a first frequency by a signal generator consisting of a single frequency source;
receiving the test signal and outputting a representation of the test signal to an antenna system by a diplexer;
causing the transmission of the representation of the test signal by the antenna system comprising a single antenna;
receiving a harmonic signal by the single antenna of the antenna system;
receiving the harmonic signal from the single antenna and outputting a representation of the harmonic signal to a filter by the diplexer;
removing signals, from the representation of the harmonic signal received by the antenna system, of the first frequency of the test signal that is transmitted by the filter;
preventing a leakage of the test signal into the representation of the harmonic signal by the diplexer;
measuring a power level of a second frequency remaining in the representation of the harmonic signal by an analysis unit; and
determining a passive harmonic magnitude based on the power level of the second frequency.

19. The non-transitory computer readable medium of claim 18, the functions further comprising causing the generating a local oscillator signal that is coupled to the signal generator and the analysis unit and provides a reference signal to both the signal generator and the analysis unit.

20. The non-transitory computer readable medium of claim 18, the functions further comprising providing an indication of a power level exceeding a threshold power level by the analysis unit.

* * * * *